United States Patent
Bejerasco et al.

(10) Patent No.: US 9,147,067 B2
(45) Date of Patent: Sep. 29, 2015

(54) SECURITY METHOD AND APPARATUS

(71) Applicant: F-Secure Corporation, Helsinki (FI)

(72) Inventors: Christine Bejerasco, Helsinki (FI);
Karmina Aquino, Helsinki (FI)

(73) Assignee: F-Secure Corporation, Helsinki (FI)

( * ) Notice: Subject to any disclaimer, the term of this patent is extended or adjusted under 35 U.S.C. 154(b) by 0 days.

(21) Appl. No.: 14/103,128

(22) Filed: Dec. 11, 2013

(65) Prior Publication Data

US 2014/0173730 A1    Jun. 19, 2014

(30) Foreign Application Priority Data

Dec. 14, 2012  (GB) .................................. 1222611.4

(51) Int. Cl.
*H04L 29/06* (2006.01)
*G06F 21/50* (2013.01)
*G06F 21/51* (2013.01)
*H04L 29/08* (2006.01)

(52) U.S. Cl.
CPC ................ *G06F 21/50* (2013.01); *G06F 21/51* (2013.01); *H04L 63/1483* (2013.01); *G06F 2221/2119* (2013.01); *H04L 63/0236* (2013.01); *H04L 63/126* (2013.01); *H04L 67/02* (2013.01)

(58) Field of Classification Search
CPC ............ H04L 63/1441; H04L 63/1483; G06F 2221/2119; G06F 21/51
USPC ......................................................... 726/22
See application file for complete search history.

(56) References Cited

U.S. PATENT DOCUMENTS

| | | | |
|---|---|---|---|
| 2008/0163380 A1* | 7/2008 | Liu .................................. | 726/28 |
| 2008/0172382 A1* | 7/2008 | Prettejohn ......................... | 707/6 |
| 2008/0303689 A1 | 12/2008 | Iverson .................... | 340/825.36 |
| 2010/0287151 A1* | 11/2010 | Mustonen ..................... | 707/707 |
| 2011/0191342 A1* | 8/2011 | Cohen et al. .................. | 707/737 |
| 2011/0296519 A1* | 12/2011 | Ide et al. ......................... | 726/13 |

FOREIGN PATENT DOCUMENTS

| | | |
|---|---|---|
| EP | 2156361 A1 | 2/2010 |
| EP | 2428017 A1 | 3/2012 |
| EP | 2531940 A1 | 12/2012 |
| WO | WO 2008/127844 A1 | 10/2008 |
| WO | WO 2010/128082 A1 | 11/2010 |
| WO | WO 2011/094746 A2 | 8/2011 |

* cited by examiner

*Primary Examiner* — Dao Ho
(74) *Attorney, Agent, or Firm* — Harrington & Smith

(57) ABSTRACT

In accordance with an example embodiment of the present invention, there is provided a method comprising: maintaining a local database of trusted uniform resource locators (URL) where an URL is qualified to said database based on fulfilling predetermined criteria; detecting a request to access a uniform resource locator (URL); obtaining reputation data for the URL from a reputation server or from a local reputation scanner; comparing the obtained reputation data of the requested URL with the reputation data of the requested URL that is stored in the local database of trusted URLs if any; if there is a conflict between the reputation data obtained and the reputation data stored in the local database of trusted URLs, using the reputation data stored in the local database of trusted URLs to determine whether access to the URL is allowed.

21 Claims, 4 Drawing Sheets

SECURITY METHOD AND APPARATUS

TECHNICAL FIELD

The exemplary and non-limiting embodiments of the present application relate generally to methods, apparatuses and computer programs and, more specifically, to the field of detecting computer file-based security threats.

BACKGROUND

Current security applications are used to prevent web users from visiting malicious uniform resource locators (URLs). This protects user's computer systems from executing malicious or unwanted software and helps avoiding malicious attacks via illegitimate webpages.

Different reputation systems are used by the security applications to evaluate the safety of accessed webpages. One problem associated with the conventional reputation systems is the inconvenience caused by false positives in cases where the reputation system misclassifies safe URLs as malicious.

Therefore, more effective ways to manage security threats are needed where false positives can be minimized without compromising security.

SUMMARY

Various aspects of examples of the invention are set out in the claims.

According to an aspect of the invention, there is provided a method as specified in claim 1.

According to an aspect of the invention, there is provided an apparatus as specified in claim 11.

According to an aspect of the invention, there is provided a computer program product as specified in claim 21.

According to an aspect of the invention, there is provided a computer-readable distribution medium carrying the above-mentioned computer program product.

According to an aspect of the invention, there is provided an apparatus comprising processing means configured to cause the apparatus to perform any of the embodiments as described in the appended claims.

According to an aspect of the invention, there is provided an apparatus comprising a processing system configured to cause the apparatus to perform any of the embodiments as described in the appended claims.

According to an aspect of the invention, there is provided an apparatus comprising means for performing any of the embodiments as described in the appended claims.

Embodiments of the invention are defined in the dependent claims.

BRIEF DESCRIPTION OF THE DRAWINGS

The accompanying drawings provide a more complete understanding of the embodiments of the present invention according to the following descriptions.

DETAILED DESCRIPTION OF THE DRAWINGS

Example embodiments of the present invention are later described in more detail with reference to the accompanying drawings, in which some embodiments of the invention are shown. The invention may be embodied in many different forms and should not be construed as limited to the embodiments presented here. Although the specification may refer to "an", "one", or "some" embodiment in several locations, this does not necessarily mean that each such reference is to the same embodiment, or that the feature only applies to a single embodiment. Single features of different embodiments may also be combined to provide other embodiments.

The present invention can apply to any terminal, server, corresponding component, or to any communication system or combination of different communications systems that support the required functionality. Due to the rapid development of the specifications of computer systems and protocols that are used, all words and expressions should be interpreted broadly; they are intended only to explain the embodiment.

The following description relates to the categorization of web page content. This may apply to any type of content, such as data, data blocks, complete files or portions of files, links and cache links.

Figure 1:
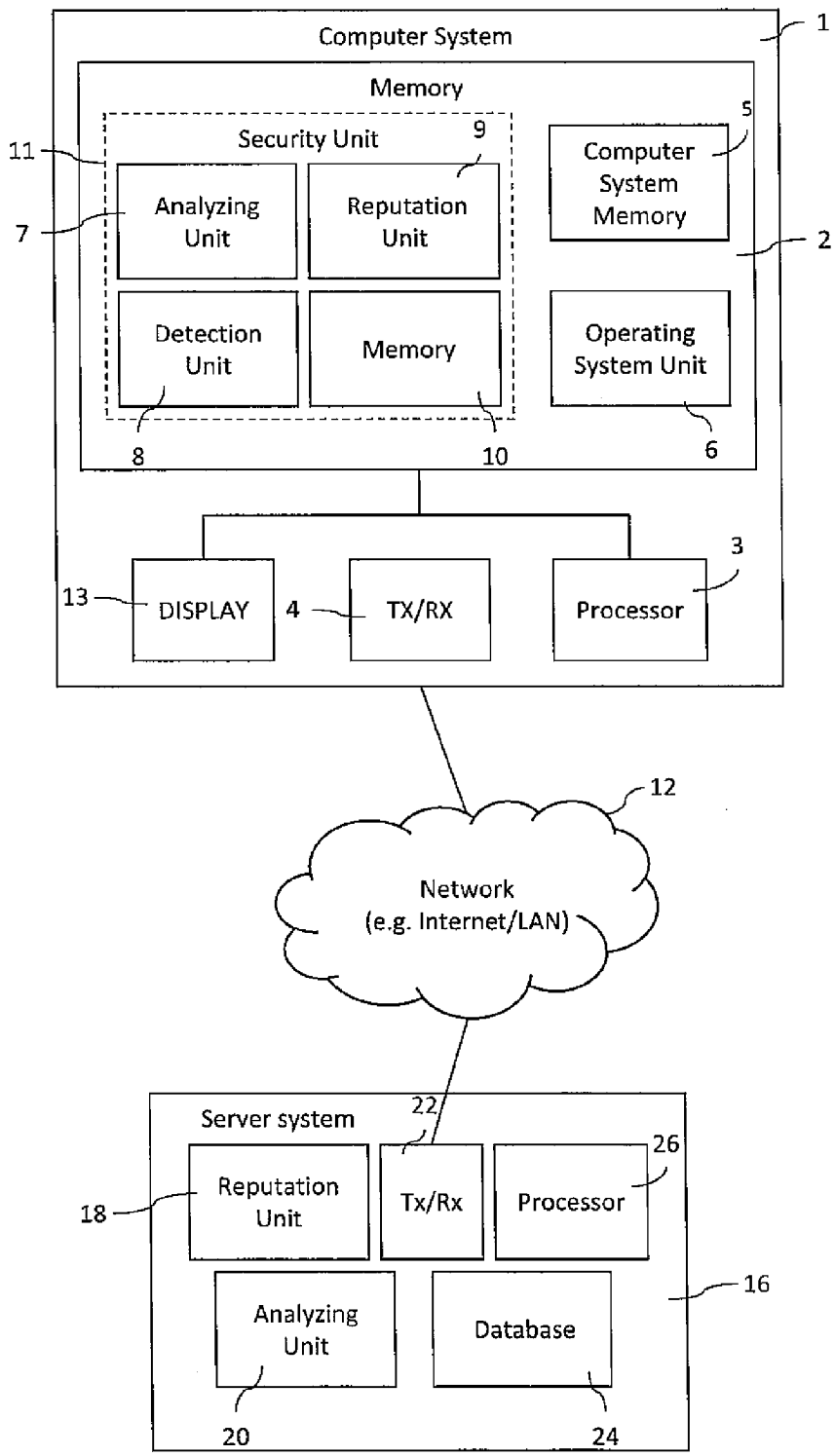
FIG. 1 shows a simplified block diagram that illustrates an example of apparatuses according to the invention.

FIG. 1 illustrates a general example of apparatuses in which the embodiments of the invention may be applied. It only shows the elements and functional entities that are required for understanding the arrangement according to an embodiment of the invention. Other components have been omitted for the sake of simplicity. The implementation of the elements and functional entities may vary from that shown in FIG. 1. The connections shown in FIG. 1 are logical connections, and the actual physical connections may be different. It is apparent to a person skilled in the field that the arrangement may also comprise other functions and structures.

FIG. 1 shows an example of a computer system 1 that is suitable for implementing the methods that are described below. The computer system 1 can be implemented as a combination of computer hardware and software. The computer system 1 comprises a memory 2, a processor 3 and a transceiver 4. The memory 2 stores the various programs or executable files that are implemented by the processor 3, and provides a computer system memory 5 that stores any data required by the computer system 1.

The programs or executable files that are stored in the memory 2, and implemented by the processor 3, can include an operating system unit 6. The memory 2 also provides a memory 10 that is used by a detection unit 8, an analyzing unit 7 and a reputation unit 9. The detection unit 8, analyzing unit 7 and reputation unit 9 can be sub-units of a security control unit 11, for example. The transceiver 4 is used to communicate over a network 12 such as a LAN, the Internet, or a mobile broadband network. Typically, the computer system 1 may be a personal computer (PC), laptop, tablet computer, or mobile phone, or any other suitable device.

The example of FIG. 1 also shows a server system 16 that may communicate with the computer system 1 and other client terminals. The server system 16 may comprise a transceiver 22 and a processor 26. The server system 16 may also comprise a database 24, and analyzing unit 20 and a reputation unit 18. The server system 16 may belong to, for example, an Internet service provider, a wireless service operator, mobile network operator, or a security service provider.

It should be noted that the computer system 1 and the server system 16 are only examples of apparatuses or systems, and that they may have more or fewer components than shown, may combine two or more components, or may have a different configuration or arrangement of the components. For example, in some embodiments the security control unit 11 forms a part of the server system 16.

The reputation unit 18 of the server system 16 and the reputation unit 9 of the computer system manage URL information from different internal and external sources. Both systems can be used to supplement one another in order to increase efficiency of detecting security threats.

Figure 2:
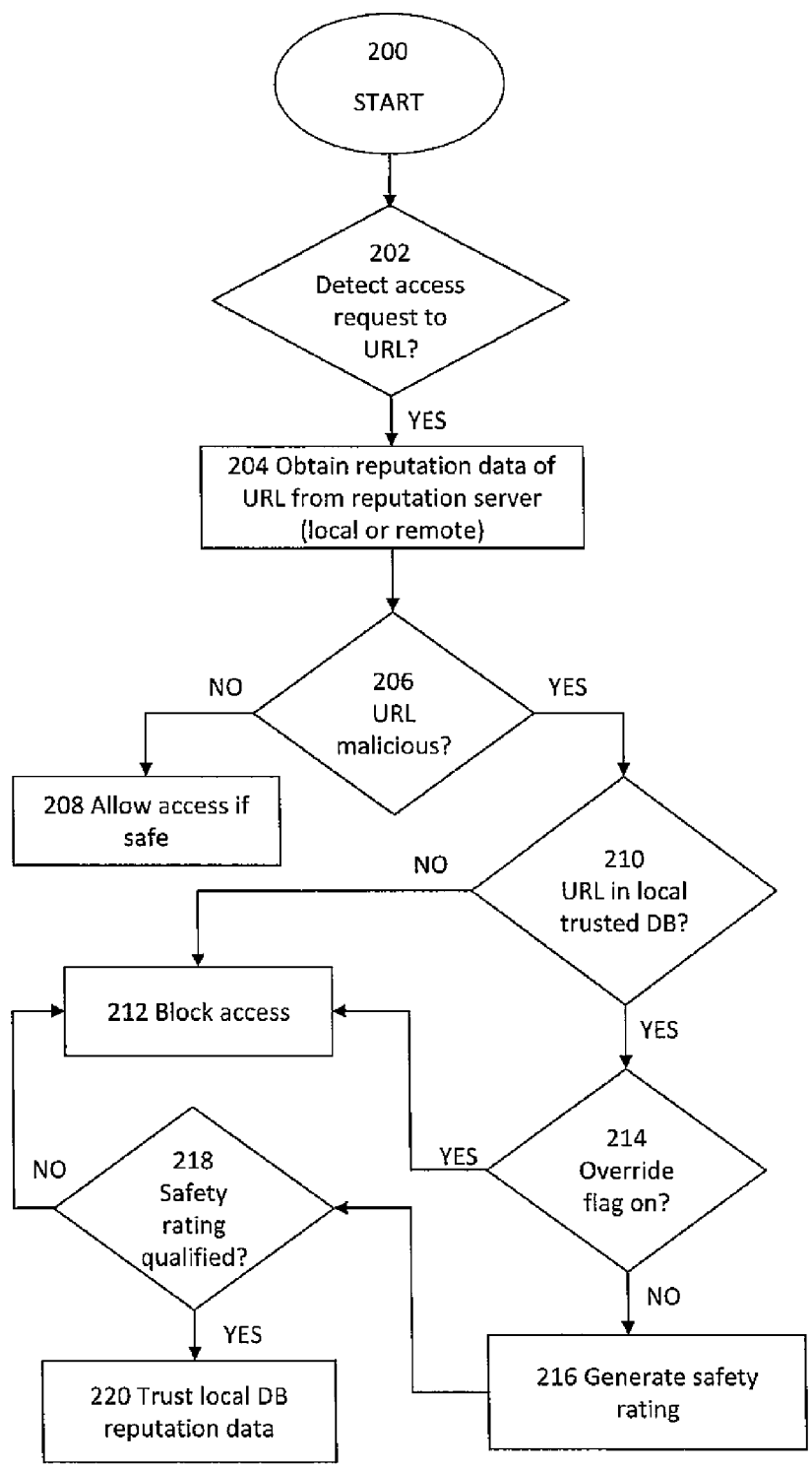
FIG. 2 shows an example of a method.

FIG. 2 is a flow diagram that shows an example of a process.

The method starts in 200.

In 202, an access request to a uniform resource locator (URL) is detected.

In 204, reputation data of the URL that was requested is obtained from a reputation server or from a local scanner.

In 206, the obtained reputation data is used to determine whether the URL is malicious.

In case the URL is determined to not being malicious, then 208 is entered where access to the URL may be allowed for the computer file if it is considered safe. A process example of this is illustrated in connection with FIG. 4.

In case the URL is determined to be malicious, then 210 is entered where it is checked if the URL can be found in a maintained local database of trusted URLs.

In case the URL is not in the local database of trusted URLs, then 212 in entered where access to the URL is blocked or restricted according to the reputation data that was obtained from the reputation server or the local scanner.

In case the URL is detected in the local database of trusted URLs, then a check for possible override flag can be made in 214. In case the override flag is on, then access to the URL may be blocked or restricted in 212. Using an override flag is an added precautionary measure so that a particular URL can always be blocked regardless of what the reputation data in the database of local trusted URLs says. The override flag can be used in situations where the possibility for false positives is highly unlikely or impossible, for example.

In case the override flag cannot be detected, then 216 may be entered where a safety rating is generated for the URL. The safety rating can be based on comparison between certain metadata of the URL that is stored in the local database of trusted URLs and the corresponding metadata related to the reputation data obtained from the reputation server or scanner. The generated safety rating can produce a safety percentage that is then compared to a predetermined safety threshold, for example. In 218, it is checked whether the safety rating qualifies the predetermined limits set for the safety rating. If not, then 212 is entered. If the safety rating value is qualified, then 220 is entered where the reputation data of the local database of trusted URLs overrides the obtained reputation data from the reputation server or the local scanner. This means that the reputation data maintained in the local database of trusted URLs is preferred over (and used instead of) the obtained reputation data and access to the URL can be allowed.

The embodiments of the invention enable reducing the impact of false positives by utilizing website metadata residing on the client computer. In an embodiment, a certain level of local trust can be given to a website when it satisfies certain conditions such as: a user visits the website often enough, the website has previously been rated as safe, the website does not have any potentially suspicious elements based on a predefined criteria.

Using the above criteria, the local database of trusted URLs can be limited to a certain amount of frequently visited URLs so as not to consume resources of the client system. The implementation of the method can be flexible. In an embodiment, the first time the user visits a website, the visit is written in the URL log. From thereafter, every URL visit may then have an expiry date (Time to Live, TTL) that can be predefined or may be flexible depending on the popularity or prevalence of the URL. If the website's TTL has already expired, the URL and its metadata are removed from the logs and the URL's local trust rating may be set back to zero. This way the expired URLs may be flushed out of the process while new websites are added based on the visits to websites.

In order to be qualified to the local database of trusted URLs, the URL may be required initially to have a safe reputation from the reputation server or via a local detection functionality or scanner, i.e. a product that scans webpages for malicious content.

In an embodiment, in addition to the TTL, the number of historical visits prior to qualifying as a locally trusted site may be predefined or be dependent on URL popularity/prevalence.

In an embodiment, the website may also be required to pass a certain criteria, such as not to show symptoms of certain possible suspicious behaviors that should not be found on a trusted site. If the website passes a certain percentage of the items in the criteria, then it may be added to the trusted list. Otherwise it may be ignored.

In an embodiment, the suspicious behaviour criteria may be comprised of one or more of the following items: presence of eval( ), document write or unescape( ) functions within Javascript; presence of <script> or <iframe> tags after a </body> tag; presence of heavy obfuscation; file format being an EXE, Java, hta and other non-html/xml or the like; high percentage of metadata changes since last visit. This list is not exhaustive and can have more or less items depending on the need to enable/disable stricter controls and depending on the evolving threat landscape.

In an embodiment, when a certain website passes the suspicious criteria check, that is, the items according to the suspicious criteria are not detected, the URL may then be added to the local database of trusted URLs. Further, certain metadata related to the URL may be extracted from the webpage for storage and comparison to next visit. The following metadata may be extracted and stored related to the URLs accepted to the local database: hashes from predefined locations on the related webpage; presence and number of iframes; presence of script tags and hashes of functions used; presence and number of internal and external links. This list is not exhaustive and more or less metadata may be added or removed from this list.

The storage of the metadata may be in hash or text format. Hashing minimizes required storage space and may serve as initial encryption for the data. Further encryption may not be required but may be used to protect the presence of this functionality.

In an embodiment, after the website is already maintained in the local database of trusted URLs, an expiry date (or Time to Live) may be assigned to the particular trusted URL entry. If the website has not been visited until the expiry date again, the trust may be revoked and the reputation of the website that is obtained from the reputation server or other client-side detection functionality may be trusted completely.

In an embodiment, when the reputation of the URL from the cloud reputation server or a local detection logic/scanner conflicts with the reputation maintained in the local database of trusted URLs, the local reputation of the website may supersede the obtained remote or common reputation.

In an embodiment, the client computer may silently report the false positive to the reputation server system.

In an embodiment, as an added precautionary measure, an override flag can be set to always block a particular URL regardless of the reputation in the local database of trusted URLs. This may be useful in situations where it is highly likely that a reputation data would not cause a false positive.

Figure 3:
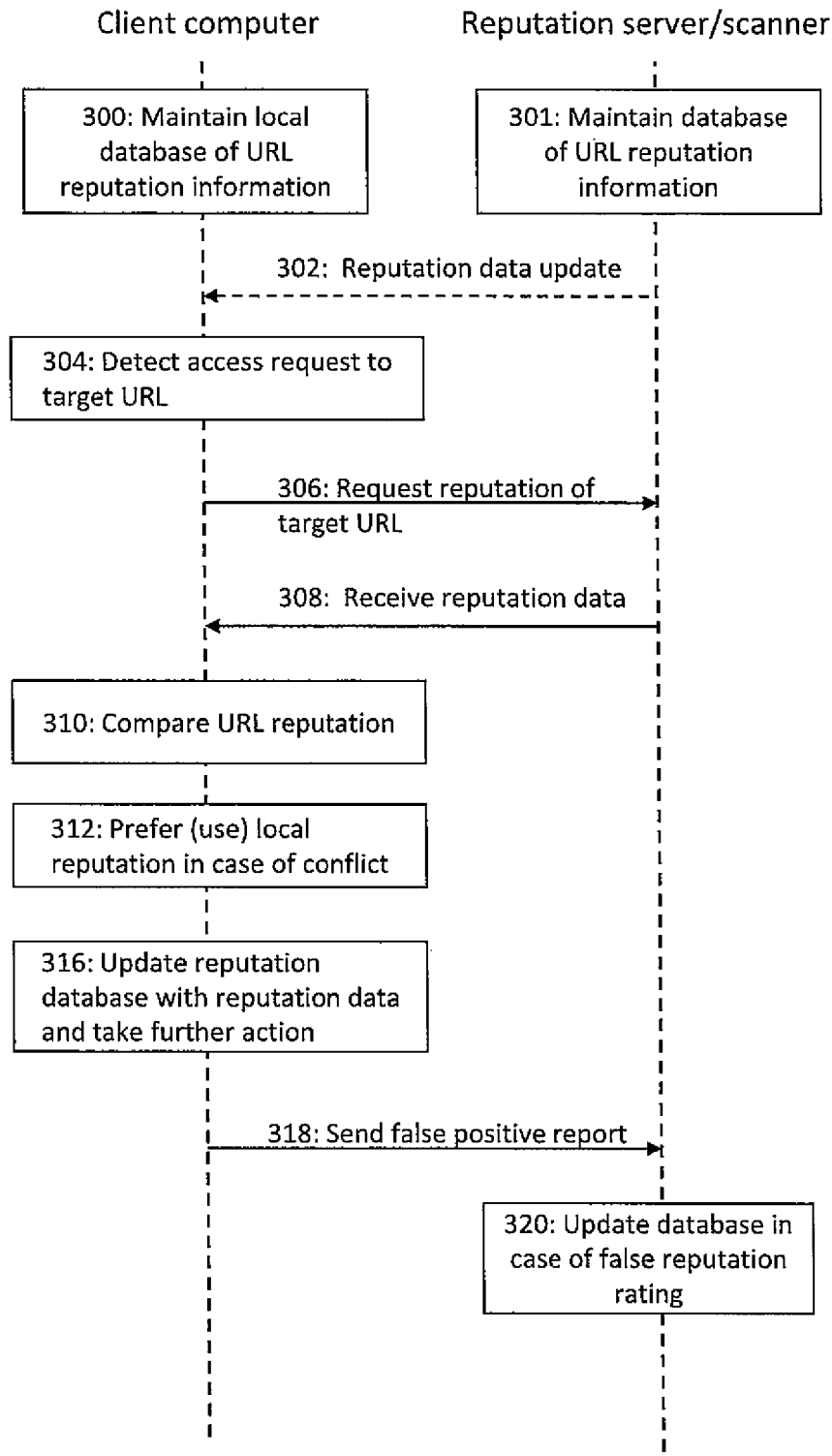
FIG. 3 is a signal sequence diagram showing an example according to an embodiment of the present invention.

FIG. 3 is a signal sequence diagram that shows another example of the process. At 300, a local database of trusted URL reputation information is maintained at the client computer. Further, the reputation server (remote server or local scanner) maintains a database of URL reputation information in 301.

In 302, it is possible that an update of the reputation data maintained in the reputation server is regularly sent to the client computer. The reputation data may be related to URL reputation information, computer file reputation data and any other reputation information that is maintained at the reputation server.

In 304, the client computer detects an access request to a URL. The URL may be connected via either HTTP GET/POST or other protocols. In an embodiment, the requested URL may be detected by accessing a packet header included in a packet request issued when requesting access to the URL.

In 306, the client computer requests to receive reputation data of the URL from the reputation server. In an embodiment, the client computer may first check whether the reputation data of the target URL has already been received earlier, for example, with regular reputation data updates received from the reputation server. In that case, the reputation data may be stored in the memory of the client computer already.

In 308, the requested reputation data of the target URL is received from the reputation server. In an embodiment, the obtained reputation data comprises an indication of whether the URL is trusted, suspicious or unknown.

In an embodiment, the client computer may perform analysis or calculation based on the received reputation data. In an embodiment, the client computer may, for example, calculate reputation scores or determine different thresholds on the basis of the received reputation data. The client computer may also use other information available from different sources when analyzing the reputation data received.

In 310, the obtained reputation data of the requested URL is compared with the reputation data of the requested URL that is stored in the local database of trusted URLs. If the URL reputation cannot be found in the local database of trusted URLs, then the obtained reputation is trusted and the access to the URL may be blocked or restricted.

In 312, if there is a conflict between the reputation data obtained and the reputation data stored in the local database of trusted URLs, the reputation data stored in the local database of trusted URLs is preferred (i.e. used) to determine whether access to the URL will be allowed or not. In an embodiment, a webpage safety percentage can be calculated for the URL in case of conflicting reputation data and if the URL still qualifies with a predetermined safety threshold, then the local reputation can be trusted. Otherwise, if the safety percentage does not qualify predetermined limits, then the reputation data for that URL can be removed from the local database of trusted URLs.

In 316, a reputation database of the client computer may be updated with the reputation data given to the URL and further action is taken based on the reputation rating. In an embodiment, accessing the URL may be allowed based on the local reputation data of the URL being good even though the obtained reputation data for the URL was not.

In 318, a false positive report may be sent to the reputation server.

In 320, the reputation server may use the received false positive report to update its own reputation databases or as a trigger to perform further investigation on the URL.

Figure 4:
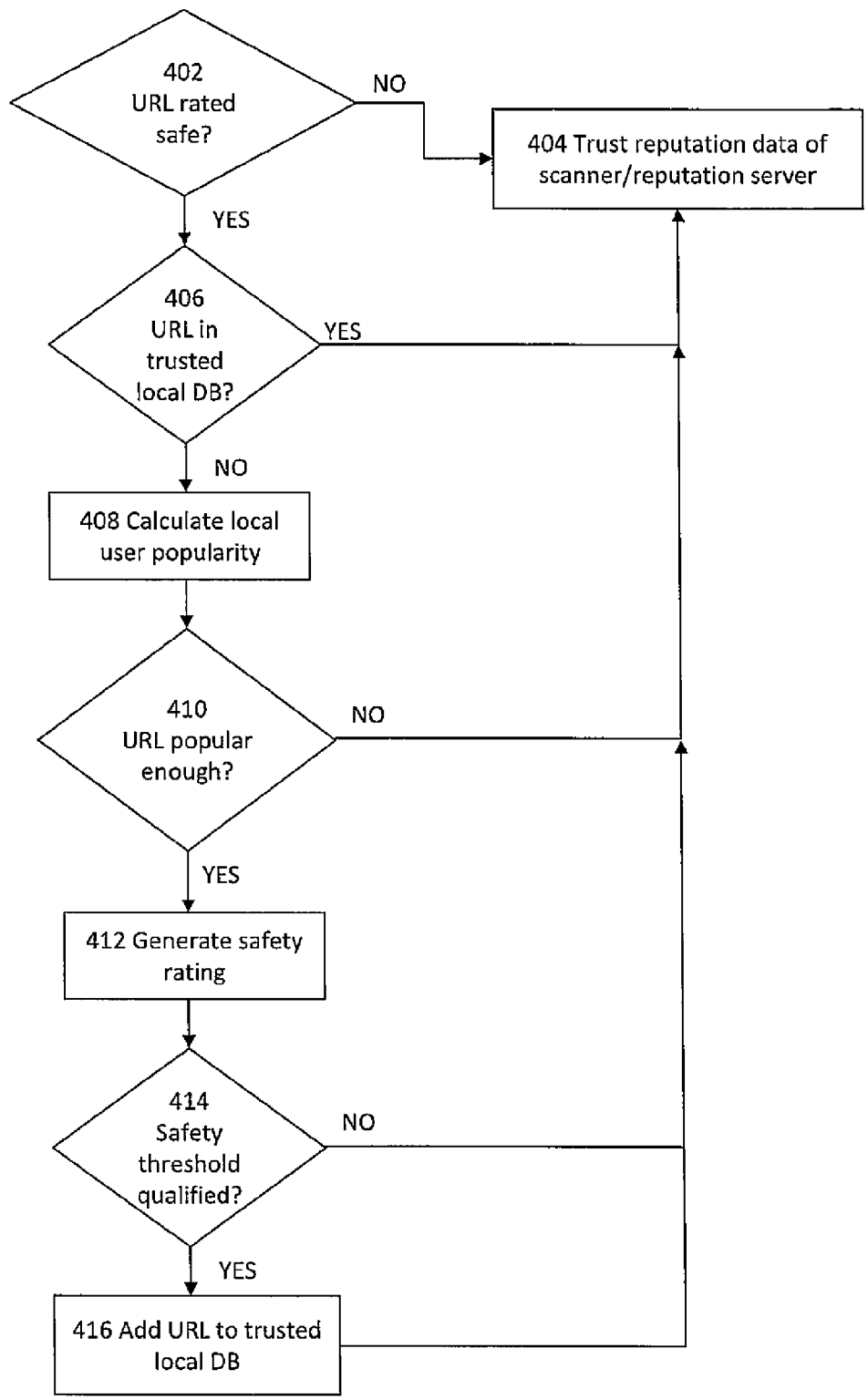
FIG. 4 shows an example of a method.

FIG. 4 shows another example of the process and of how an URL may be added to the local database of trusted URLs. Following 206 of the example process of FIG. 2, if the requested URL is not considered malicious, then in 402, it is determined whether the requested URL is rated safe. If not, then 404 is entered where the reputation data obtained from the local scanner or reputation server is trusted. If the URL is rated safe, then in 406 it is checked whether the URL can be found in the local database of trusted URLs. If yes, then 404 is entered.

If the URL that is rated safe is not in the local database of the trusted URLs, then 408 is entered where a local user popularity score is calculated for the URL. The calculation can be based on detected and stored number of historical visits to the URL, for example. In 410 it is determined whether the URL is popular enough based on the calculated local user popularity. The calculated popularity score may be compared to predetermined thresholds or percentages calculated from a ratio of number of visits to specific URLs to the number of total URL visits in the user's device during a given period of time to determine if the URL is popular enough. The threshold comparisons may be used, for example, when a user is not a heavy Internet user. However, for heavy Internet users (for example, users spending large amount of time online or use a lot of bandwidth), it may be that the percentages may provide a more accurate view.

If the URL is not popular enough, then 404 is entered. If the URL is popular enough, then 412 is entered where a safety rating is calculated for the URL. A combination of metadata produced purely on the client device side and metadata retrieved from the server may be used for calculating the safety rating. However, the safety rating can also be calculated based on metadata obtained solely from the server or based on metadata that has been stored or generated by the client device. For example, if a certain URL does not contain suspicious functionalities such as the presence of <iframe> tags, unescape( ) or eval( ) functions, the URL may not qualify under suspicious regular expression patterns and finally, if the server reports that it does not belong to any suspicious ASN (Autonomous System Number), then it may qualify in the "safety threshold". The safety threshold can be determined to be as strict or as relaxed as possible or anything in between. The safety threshold may be set to a predetermined level by a security application, the server system or by the user of the device depending on prerogatives. It is also possible that the safety thresholds are regularly monitored and/or redetermined based on detected changes on the system or detected user behavior, for example.

In 414 it is determined whether the calculated safety rating qualifies a predetermined safety threshold. If not, then 404 is entered and if yes, then 416 is entered where the URL is added to the local database of trusted URLs.

Without limiting the scope, interpretation, or application of the claims appearing below, the technical effects of one or more of the example embodiments disclosed here enable controlling security threats in an efficient manner and even automatically. The embodiments of the invention enable saving resources of the computer system. By using URL reputation data stored in the local database in addition to the reputation data obtained from reputation servers as a basis for determining a reputation for the URL, the embodiments can prevent unnecessary false positives and inconvenience caused thereby without compromising security of the system. Avoiding inconvenience caused by false positives is possible in a user friendly manner.

For example, users having their own websites or blogs usually visit them frequently and having false positives on those websites can cause unnecessary worry for the users. By using latest website metadata residing on the user's computer itself, it is possible to compare and detect whether the website has really changed and become malicious or should the false positive rating received from the reputation server be ignored.

The steps, points, signaling messages and related functions described above in relation to FIGS. 2, 3 and 4 are in no absolute chronological order, and some of the steps may be performed simultaneously or in a different order. Other functions may also be executed between the steps or within the steps, and other signaling messages may be sent between the illustrated ones. Some of the steps can also be left out or replaced by a corresponding step. The system functions illustrate a procedure that may be implemented in one or more physical or logical entities.

The techniques described here may be implemented by various means. An apparatus or system that implements one or more of the described functions with an embodiment comprises not only existing means, but also means for implementing one or more functions of a corresponding apparatus that is described with an embodiment. An apparatus or system may also comprise separate means for each separate function. These techniques may be implemented in hardware (one or more modules) or combinations thereof. For software, implementation can be through modules, for example, procedures and functions that perform the functions described here. The software code may be stored in any suitable data storage medium that is readable by processors, computers, memory unit(s) or articles(s) of manufacture, and may be executed by one or more processors or computers. The data storage medium or memory unit may be implemented within the processor or computer, or as an external part of the processor or computer, in which case it can be connected to the processor or computer via various means known in the field.

The programming, such as executable code or instructions, electronic data, databases or other digital information can be stored into memories and may include a processor-usable medium. A processor-usable medium may be embodied in any computer program product or article of manufacture which can contain, store, or maintain programming, data or digital information for use by or in connection with an instruction execution system, including the processor 3, 26 in the exemplary embodiments.

An embodiment provides a computer program product that comprises a computer-readable medium bearing computer program code embodied therein for use with a computer. The computer program code comprises: code for maintaining a local database of trusted uniform resource locators (URL) where an URL is qualified to the database based on fulfilling predetermined criteria; code for detecting a request to access a uniform resource locator (URL); code for obtaining reputation data for the URL from a reputation server or from a local reputation scanner; code for comparing the obtained reputation data of the requested URL with the reputation data of the requested URL that is stored in the local database of trusted URLs if any; code for preferring, i.e. using, the reputation data stored in the local database of trusted URLs to determine whether access to the URL is allowed if there is a conflict between the reputation data obtained and the reputation data stored in the local database of trusted URLs.

Embodiments of the present invention may be implemented in software, hardware, application logic or a combination of these. In an example of an embodiment, the application logic, software or a set of instructions is maintained on any conventional computer-readable media. In the context of this document, a "computer-readable medium" may be any media or means that can contain, store, communicate, propagate or transport the instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a computer.

The various aspects of the invention are not limited to the combinations explicitly set out in the independent claims. Other aspects of the invention may comprise combinations of features from the described embodiments, the dependent claims and the independent claims.

It is obvious to a person skilled in the field that, as the technology advances, the inventive concept can be implemented in various ways. The invention and its embodiments are not limited to the examples described above but may vary within the scope of the claims.

What is claimed is:

1. A security method, comprising:
maintaining a local database of trusted uniform resource locators (URL) where an URL is qualified to said database based on fulfilling predetermined criteria;
detecting a request to access a uniform resource locator (URL);
in response to the detection:
obtaining first reputation data for the URL from a reputation server or from a local reputation scanner;
in the case where the local database does not contain second reputation data of the requested URL, using said first reputation data to determine whether access to the URL is allowed;
in the case where the local database contains second reputation data of the requested URL, comparing the first reputation data of the requested URL with the second reputation data of the requested URL in order to determine whether or not there is a conflict between the first reputation data and the second reputation data, and, in the case where there is a conflict, using the second reputation data to determine whether access to the URL is allowed, and, in the case where there is not a conflict, allowing access to the URL; and
further comprising: generating a URL safety rating when a conflict between the reputation data obtained and the reputation data stored in the local database of trusted URLs is detected and allowing access to the URL based upon a comparison of the generated safety rating with a safety threshold.

2. The method of claim 1, further comprising qualifying an URL to the local database of trusted URLs based on fulfilling one or more of the following criteria; detected frequent visits to the URL, reputation of the URL being rated as safe, no suspicious elements according to predefined criteria detected.

3. The method of claim 2, further comprising maintaining an URL in the local database of trusted URLs for a predetermined period after each detected visit to the URL.

4. The method of claim 2, wherein the suspicious elements preventing an URL to qualify to the local database of trusted URLs comprise detection of one or more of: presence of eval( ), document write or unescape( ) functions within Javascript; presence of <script> or <iframe> tags after a </body> tag; presence of heavy obfuscation; file format being an EXE, Java, hta and other non-html/xml or the like; high percentage of metadata changes since last visit to the URL; association with a malicious ASN (autonomous system number), an IP address, name server or domain.

5. The method of claim 1, further comprising extracting predetermined metadata from the URL qualified in the local database of trusted URLs and storing the extracted metadata in the local database of trusted URLs.

6. The method of claim 5, wherein the extracted metadata comprises one or more of: hashes from predefined locations on the related webpage; presence and number of iframes; presence of script tags and hashes of functions used; presence and number of internal and external links.

7. The method of claim 1, wherein when determining whether access to the URL is allowed, the method further comprising trusting the obtained reputation data for the URL from the reputation server or from the local reputation scanner over the reputation data stored in the local database of trusted URLs when an override flag blocking the URL is detected.

8. The method of claim 1, wherein the safety rating is generated on the basis of metadata related to the URL.

9. The method of claim 1, further comprising reporting a reputation server about the obtained reputation data for the URL being a false positive when access to the URL is allowed after detecting a conflict between the reputation data obtained and the reputation data stored in the local database of trusted URLs.

10. The method of claim 1, wherein a URL is qualified to the database of trusted URLs based on the URL being rated as safe at the time of qualification.

11. An apparatus, comprising:
at least one processor; and
at least one memory including computer program code the at least one memory and the computer program code configured to, with the at least one processor, cause the apparatus to perform at least the following:
maintaining a local database of trusted uniform resource locators (URL) where an URL is qualified to said database based on fulfilling predetermined criteria;
detecting a request to access a uniform resource locator (URL);
in response to the detection:
obtaining first reputation data for the URL from a reputation server or from a local reputation scanner;
in the case where the local database does not contain second reputation data of the requested URL, using said first reputation data to determine whether access to the URL is allowed;
in the case where the local database contains second reputation data of the requested URL, comparing the first reputation data of the requested URL with the second reputation data of the requested URL in order to determine whether or not there is a conflict between the first reputation data and the second reputation data, and, in the case where there is a conflict, using the second reputation data to determine whether access to the URL is allowed, and, in the case where there is not a conflict, allowing access to the URL; and
wherein the apparatus is further configured to: generate a URL safety rating when a conflict between the reputation data obtained and the reputation data stored in the local database of trusted URLs is detected and allow access to the URL based upon a comparison of the generated safety rating with a safety threshold.

12. The apparatus of claim 11, wherein the apparatus is further configured to: qualify an URL to the local database of trusted URLs based on fulfilling one or more of the following criteria: detected frequent visits to the URL, reputation of the URL being rated as safe, no suspicious elements according to predefined criteria detected.

13. The apparatus of claim 12, wherein the apparatus is further configured to: maintain an URL in the local database of trusted URLs for a predetermined period after each detected visit to the URL.

14. The apparatus of claim 12, wherein the suspicious elements preventing an URL to qualify to the local database of trusted URLs comprise detection of one or more of: presence of eval( ) document write or unescape( )functions within Javascript; presence of <script> or <iframe> tags after a </body> tag; presence of heavy obfuscation; file format being an EXE, Java, hta and other non-html/xml or the like; high percentage of metadata changes since last visit to the URL; association with a malicious ASN (autonomous system number), an IP address, name server or domain.

15. The apparatus of claim 11, wherein the apparatus is further configured to: extract predetermined metadata from the URL qualified in the local database of trusted URLs and storing the extracted metadata in the local database of trusted URLs.

16. The apparatus of claim 15, wherein the extracted metadata comprises one or more of: hashes from predefined locations on the related webpage; presence and number of iframes; presence of script tags and hashes of functions used; presence and number of internal and external links.

17. The apparatus of claim 11, wherein when determining whether access to the URL is allowed, the apparatus is further configured to: trust the obtained reputation data for the URL from the reputation server or from the local reputation scanner over the reputation data stored in the local database of trusted URLs when an override flag blocking the URL is detected.

18. The apparatus of claim 11, wherein the safety rating is generated on the basis of metadata related to the URL.

19. The apparatus of claim 11, wherein the apparatus is further configured to report a reputation server about the obtained reputation data for the URL being a false positive when access to the URL is allowed after detecting a conflict between the reputation data obtained and the reputation data stored in the local database of trusted URLs.

20. The apparatus of claim 11, wherein a URL is qualified to the database of trusted URLs based on the URL being rated as safe at the time of qualification.

21. A computer program product comprising a non-transitory computer-readable medium bearing computer program code embodied therein for use with a computer, the computer program code comprising:
code for maintaining a local database of trusted uniform resource locators (URL) where an URL is qualified to said database based on fulfilling predetermined criteria;
code for detecting a request to access a uniform resource locator (URL);
code for, in response to the detection, obtaining first reputation data for the URL from a reputation server or from a local reputation scanner;
code for, in the case where the local database does not contain second reputation data of the requested URL, using said first reputation data to determine whether access to the URL is allowed;
code for, in the case where the local database contains second reputation data of the requested URL, comparing the first reputation data of the requested URL with the second reputation data of the requested URL in order to determine whether or not there is a conflict between the first reputation data and the second reputation data, and, code for, in the case where there is a conflict, using the second reputation data to determine whether access to the URL is allowed, and, code for, in the case where there is not a conflict, allowing access to the URL; and code for generating a URL safety rating when a conflict between the reputation data obtained and the reputation data stored in the local database of trusted URLs is detected and allow access to the URL based upon a comparison of the generated safety rating with a safety threshold.

* * * * *